Oct. 5, 1948.　　　C. E. RUSSELL　　　2,450,691
NONSKID DEVICE
Filed June 5, 1947
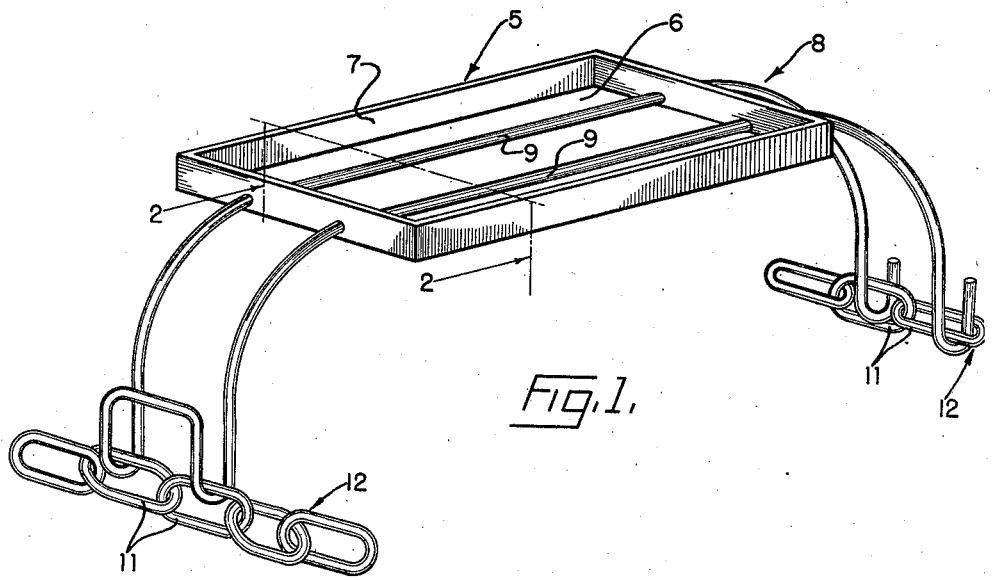
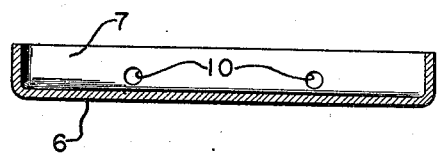
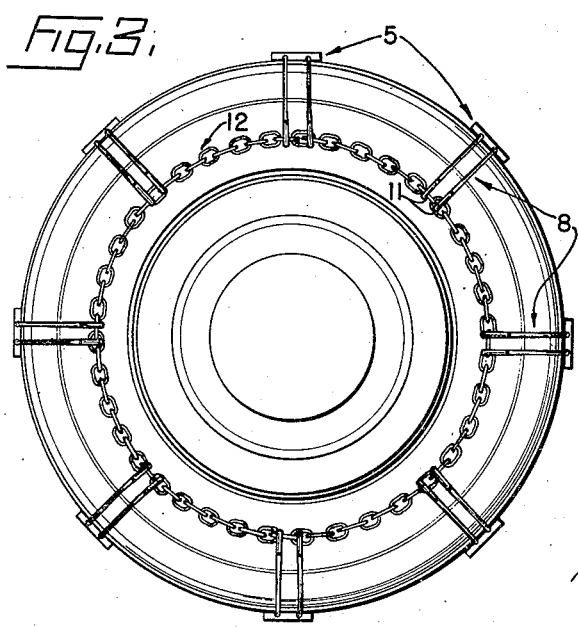
INVENTOR.
CLYDE E. RUSSELL.
BY
*Harvey + O'Connell*
ATTORNEYS.

Patented Oct. 5, 1948

2,450,691

UNITED STATES PATENT OFFICE 2,450,691

NONSKID DEVICE

Clyde E. Russell, Massillon, Ohio

Application June 5, 1947, Serial No. 752,621

3 Claims. (Cl. 152—225)

This invention relates to anti-slipping or nonskid devices for application to pneumatic vehicle wheels to obtain traction and prevent skidding when traveling on snow, ice or mud covered road surfaces.

Particularly the present invention is directed to an improved traction and anti-skid lug which may be used either as an independent unit, or, in the alternative, in combination with a plurality of similar units and side chains to provide a complete skid chain for the vehicle tire.

The traction increasing and anti-skid device of this invention is capable of being economically produced by mass production methods, and may be readily associated with the side chains of an anti-skid chain either as a substitute for one of the cross members of such chain, or as one of a number of similar units to serve as the cross chain members of an efficient anti-skid chain assembly.

The invention, together with its objects and advantages will be best understood from the following detailed description when read with reference to the accompanying drawing wherein is illustrated a presently preferred embodiment of the invention, and in which;

Figure 1 is a perspective view of a non-skid device embodying the features of the present invention, portions only of the side chains being illustrated;

Figure 2 is a transverse sectional view through the cleat proper and taken substantially on the line 2—2 of Figure 1; and Figure 3 is a side elevational view of an antiskid chain embodying the features of the present invention, and illustrating the same as applied to a pneumatic vehicle wheel.

Referring now in detail to the drawings, it will be seen that the numeral 5 indicates generally my improved non-skid device. The same comprises a ground engaging cleat formed from a single blank of metal or other suitable material, cut, shaped and dimensioned to provide a rectangular, shallow, pan-like structure having a bottom or body member 6 and a marginal wall or continuous traction-increasing rim 7, and an attaching member 8. This attaching member 8 is formed from a single length of wire rod bent into substantial U-shape to provide a pair of parallel rod members 9, 9. These rod members 9 are trained in spaced parallelism through the apertures 10 provided in opposite portions of the wall or rim 7 and at the ends thereof are formed to engage adjacent links 11, 11 of conventional side chains 12, 12.

As shown in Figure 1, each cross member is secured between the chains 12 by first passing the free ends of the rod portions 9 of the U-shaped member 8 through adjacent links 11 of one side chain 12. The rod portions 9 are then passed through the openings 10 provided as aforementioned in the wall 7 of the cleat, and the free ends of these rod portions 9 are then passed through adjacent links 11 of the other side chain 12 and clenched into positive engagement with said links. Also, and as shown in Figure 1, the portions 9 of the member 8 where they pass through the links 11 of the first mentioned side chain, and in the region of the closed end of the U, may be bent upwardly and clenched into positive engagement with these links of this side chain.

As will be appreciated, the non-skid device consisting of the ground engaging cleat and the attaching member 8, may be applied to a conventional anti-skid chain as a substitute for one of the cross members of such chain, or, as clearly shown in Figure 3, an entire anti-skid chain made up of a circular series of these cross members 5 and a pair of side chains 12 may be provided within the contemplation of this invention.

It will also be appreciated from the foregoing that each cross member embodying the features of the present invention may be quickly and conveniently engaged with the side chains, and that the formation of the cleat proper in combination with the portions 9, 9 of the attaching member 8 extending across the cleat cooperate to insure engagement with the mud or snow covered road surface as to effectively prevent circumferential and lateral slippage.

Although I have herein shown and described a preferred embodiment of this invention, it is to be understood that various changes may be made therein within the scope of the claims hereto appended.

What is claimed as new is:

1. An anti-skid device for vehicle wheels, comprising a traction cleat, and an attaching member therefor in the form of a single length of wire rod bent into substantially U-shape and having opposed parallel portions thereof trained through openings in opposed wall portions of the cleat.

2. An anti-skid chain comprising a pair of side chains, cross members connecting said side chains, each of the cross members comprising a cleat, and a length of wire rod bent into substantially U-shape and having the legs of the U trained through links of one side chain, opposed apertured portions of the cleat, and links of the other of the side chains for securing the cross member between said chains.

3. An anti-skid device for vehicle wheels, comprising a traction cleat, chains on opposite sides of the wheel, an attaching member for the cleat in the form of a single length of wire rod bent into substantially U-shape, and having opposed parallel portions thereof trained through openings in the cleat, the extremities of said parallel portions being bent upwardly through links of the chains on both sides of the tire.

CLYDE E. RUSSELL.

REFERENCES CITED

The following references are of record in the file of this patent:

UNITED STATES PATENTS

| Number | Name | Date |
| --- | --- | --- |
| 816,182 | Prouty | Mar. 27, 1906 |
| 1,451,183 | Shrock | Apr. 10, 1923 |
| 1,653,781 | Reger | Dec. 27, 1927 |

FOREIGN PATENTS

| Number | Country | Date |
| --- | --- | --- |
| 529,764 | Germany | Feb. 20, 1929 |